(12) United States Patent
Sakuma et al.

(10) Patent No.: US 10,388,419 B2
(45) Date of Patent: Aug. 20, 2019

(54) ADSORBENT FOR ADSORBING IODINE COMPOUNDS AND/OR ANTIMONY, METHOD FOR PREPARING SAID ADSORBENT, AND METHOD AND APPARATUS FOR TREATING RADIOACTIVE WASTE LIQUID BY USING SAID ABSORBENT

(71) Applicants: EBARA CORPORATION, Tokyo (JP); NIHON KAISUI CO., LTD., Tokyo (JP)

(72) Inventors: Takashi Sakuma, Tokyo (JP); Makoto Komatsu, Tokyo (JP); Takeshi Izumi, Tokyo (JP); Tomohiko Ito, Tokyo (JP); Toru Shibuya, Fukushima (JP)

(73) Assignees: EBARA CORPORATION, Tokyo (JP); NIHON KAISU CO., LTD., Tokyo (JP)

( * ) Notice: Subject to any disclaimer, the term of this patent is extended or adjusted under 35 U.S.C. 154(b) by 58 days.

(21) Appl. No.: 15/575,504

(22) PCT Filed: Jun. 3, 2016

(86) PCT No.: PCT/JP2016/066666
§ 371 (c)(1),
(2) Date: Nov. 20, 2017

(87) PCT Pub. No.: WO2016/195096
PCT Pub. Date: Dec. 8, 2016

(65) Prior Publication Data
US 2018/0158558 A1    Jun. 7, 2018

(30) Foreign Application Priority Data
Jun. 4, 2015    (JP) .................. 2015-114113

(51) Int. Cl.
| | |
|---|---|
| *G21F 9/16* | (2006.01) |
| *B01J 20/06* | (2006.01) |
| *B01J 20/28* | (2006.01) |
| *G21F 9/12* | (2006.01) |
| *B01D 15/36* | (2006.01) |
| *B01J 29/08* | (2006.01) |
| *B01J 29/18* | (2006.01) |
| *B01J 29/70* | (2006.01) |
| *C08L 27/12* | (2006.01) |
| *C02F 101/00* | (2006.01) |
| *C02F 101/20* | (2006.01) |

(52) U.S. Cl.
CPC ........... *G21F 9/167* (2013.01); *B01D 15/361* (2013.01); *B01J 20/06* (2013.01); *B01J 20/28* (2013.01); *B01J 29/08* (2013.01); *B01J 29/18* (2013.01); *B01J 29/7003* (2013.01); *C08L 27/12* (2013.01); *G21F 9/12* (2013.01); *B01D 2252/10* (2013.01); *B01D 2257/60* (2013.01); *C02F 2101/006* (2013.01); *C02F 2101/20* (2013.01)

(58) Field of Classification Search
CPC ......... G21F 9/16; G21F 9/167; B01D 15/361; B01J 20/06
USPC ............................................................ 588/7
See application file for complete search history.

(56) References Cited

FOREIGN PATENT DOCUMENTS

| | | |
|---|---|---|
| JP | 2540401 B | 7/1996 |
| JP | 2004-330012 A | 11/2004 |
| JP | 2012-251912 A | 12/2012 |
| JP | 2013-142573 A | 7/2013 |
| JP | 2015-059870 A | 3/2015 |
| JP | 2016-061784 A | 4/2016 |

OTHER PUBLICATIONS

International Search Report dated Sep. 6, 2016 for WO 2016/195096 A1.

*Primary Examiner* — Edward M Johnson
(74) *Attorney, Agent, or Firm* — Abelman, Frayne & Schwab

(57) ABSTRACT

Provided are an adsorbent capable of removing radioactive water liquid including iodine compounds and/or antimony by means of a water passing treatment, and a method and an apparatus for treating radioactive waste liquid by using the adsorbent. The adsorbent includes a polymer resin and 10 parts by weight or more of a hydrous hydroxide of a rare earth element based on 100 parts by weight of the polymer resin, in which the hydrous hydroxide of the rare earth element has a water content of 1 part by weight to 30 parts by weight based on 100 parts by weight of a dry product thereof, and adsorbs iodine compounds and/or antimony.

10 Claims, 2 Drawing Sheets

ADSORBENT FOR ADSORBING IODINE COMPOUNDS AND/OR ANTIMONY, METHOD FOR PREPARING SAID ADSORBENT, AND METHOD AND APPARATUS FOR TREATING RADIOACTIVE WASTE LIQUID BY USING SAID ABSORBENT

CROSS REFERENCE TO RELATED APPLICATIONS

This application is a national phase of PCT application No. PCT/JP2016/066666, filed on 3 Jun. 2016, which claims priority from Japanese patent application No. 2015-114113, filed on 4 Jun. 2015, all of which are incorporated herein by reference.

TECHNICAL FIELD

The present disclosure relates to a novel adsorbent, a method for preparing the novel adsorbent, and a method and an apparatus for treating radioactive waste liquid by using the adsorbent, and more particularly, to a technology which adsorbs iodine compounds and/or antimony in radioactive waste liquid. In the present specification and the claims, an "iodine compound" refers to a material including an iodide ion ($I^-$) and an iodate ion ($IO_3^-$).

BACKGROUND

In nuclear power plants widely spread over the globe, radioactive materials are produced by nuclear fission in nuclear reactors. Examples of the radioactive materials produced as byproducts include radioactive iodine, radioactive strontium, radioactive cesium, radioactive antimony, radioactive ruthenium, and the like, and the effects of these radioactive materials on the human body are concerned. A portion of the radioactive materials produced is also included in vapor and cooling water in a storage vessel in a nuclear reactor. Typically, radioactive materials produced are treated in a nuclear power plant, but for an unexpected reason, such as an accident during treatment of nuclear fuel or a reckless accident in a nuclear reactor, and also in a case such as the Fukushima first nuclear power plant accident which occurred on Mar. 11, 2011, there is a concern in that radioactive materials produced may be released.

Among them, radioactive iodine and radioactive cesium have a low vaporization temperature of 184° C. and 680° C., respectively, and thus are easily vaporized compared to other radioactive materials, so that the radioactive iodine and the radioactive cesium are positioned as three main nuclides in radioactive contamination. As the radioactive iodine, iodine 129 and iodine 131 are main components. Iodine 129 is characterized in that the half-life of iodine 129 is 107 years, which is very long, but the amount of iodine 129 released is small, and the energy of iodine 129 is also low. Meanwhile, iodine 131 is characterized in that the half-life of iodine 131 is 8 days, which is short, but the amount of iodine 131 released is large, and the energy of iodine 131 is high.

Iodine is a trace element which is required to synthesize thyroid hormones in the body and is vital for the human body. When ingested and absorbed in the human body, iodine is collected and accumulated in the thyroid gland in the blood. For this reason, when radioactive iodine is ingested and absorbed, there is a risk that the radioactive iodine is collected in the thyroid gland as in the typical iodine, and as a result, may cause internal exposure of radiation. Since iodine in water may also be in the form of iodic acid which is oxo acid in many cases, iodine and iodine oxo acid need to be treated in order to remove radioactive iodine in water.

As a method for treating radioactive iodine in water, an electrolytic coagulating sedimentation treatment with the addition of silver zeolite has been studied so far (see Patent Document 1). Further, there has been proposed a treatment which includes adding a reducing agent to water to reduce an iodate ion ($IO_3^-$), which is difficult to precipitate in the coagulating sedimentation method of the related art, to an iodine ion ($I^-$), and adding silver nitrate to the iodine ion ($I^-$) to produces and precipitates silver iodide (AgI) (see Patent Document 2).

However, the treatment method using coagulating sedimentation has a tendency to increase the running costs because the industrial waste treatment of sludge generated during the coagulating sedimentation treatment also needs to be considered. In addition, an instrument constituting a treatment device extends to various fields such as various chemical injection devices, a precipitation tank, and solid-liquid separation, and also needs a facility with a large installation space.

Furthermore, it is disclosed that iodine adsorbent powder (Ag-13X produced by reacting Zeolite 13X powder with a silver solution, then washing the reaction product with distilled water, drying the product at a suitable temperature of 100° C. or more, and subjecting the product to silver ion exchange in Zeolite 13X powder as an iodine adsorbent powder) cannot adsorb antimony, and as a result, antinomy remains (Patent Document 3).

PRIOR ART DOCUMENT

Patent Document

Patent Document 1: Japanese Patent Laid-Open Publication No. 2013-142573
Patent Document 2: Japanese Patent No. 2540401
Patent Document 3: Japanese Patent Laid-Open Publication No. 2016-061784

DISCLOSURE OF THE INVENTION

Problems to be Solved

An object of the present disclosure is to provide an adsorbent which has excellent economic feasibility and also performs an adsorption treatment in a space-saving facility, which is called as a water passing treatment by solving the problems in the related art in providing an effective removal technology capable of treating iodine compounds such as iodine and iodine oxo acid from cooling water, contaminated water, and the like, which include radioactive iodine generated for a reason such as leakage from a nuclear power plant.

Means to Solve the Problem

As a result of conducting intensive studies on the object, the present inventors have found that an adsorbent containing a large amount of a specific rare earth element in a resin (hereinafter, referred to as an "adsorbent") exhibits high adsorption performance for iodine oxo acid such as iodic acid, also exhibits high adsorption performance even for iodine when silver zeolite is contained, and also exhibits high adsorption performance even for antimony. Based on this finding, the present inventors also provide a treatment method capable of adsorbing and removing iodine compounds and/or antimony by filling an adsorption tower with the adsorbent and only allowing contaminated water including iodine compounds such as radioactive iodine and iodine oxo acid and/or antimony to pass through the adsorption tower.

According to the present disclosure, provided are an adsorbent in the following aspect, a method for preparing the adsorbent, and a method and an apparatus for treating radioactive waste liquid.

[1] An adsorbent including: a polymer resin; and 10 parts by weight or more of a hydrous hydroxide of a rare earth element based on 100 parts by weight of the polymer resin, in which the hydrous hydroxide of the rare earth element has a water content of 1 part by weight to 30 parts by weight based on 100 parts by weight of a dry product thereof, and adsorbs iodine compounds and/or antimony.

[2] The adsorbent described in [1], in which the adsorbent has an average particle diameter of 0.2 mm to 5.0 mm.

[3] The adsorbent described in [1] or [2], in which the hydrous hydroxide of the rare earth element is an aggregate whose secondary particles have an average particle diameter of 0.2 μm to 25 μm.

[4] The adsorbent described in any one of [1] to [3], in which the polymer resin is a fluorine-based resin or a polyvinyl-based resin, and the rare earth element constituting the hydrous hydroxide of the rare earth element is selected from scandium (Sc), yttrium (Y), lutetium (Lu), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), and a combination thereof.

[5] The adsorbent described in any one of [1] to [4], in which the hydrous hydroxide of the rare earth element is cerium hydroxide (IV)-n-hydrate ($Ce(OH)_4 \cdot nH_2O$).

[6] The adsorbent described in any one of [1] to [5], in which a content of the hydrous hydroxide of the rare earth element is 400 parts by weight or more based on 100 parts by weight of the polymer resin.

[7] The adsorbent described in any one of [1] to [6], further including 10 parts by weight or more of silver zeolite based on 100 parts by weight of the polymer resin.

[8] The adsorbent described in [7], in which the silver zeolite is an aggregate having an average particle diameter of 1 μm to 10 μm, which is formed by supporting silver onto a zeolite selected from A-type, X-type, Y-type, β-type, mordenite-type, chabazite-type, or a combination of one or more thereof.

[9] A method for treating radioactive waste liquid, including adsorbing iodine compounds and/or antimony by allowing the radioactive waste liquid to pass through an adsorption tower filled with the adsorbent described in any one of [1] to [8] with a layer height of 10 cm to 300 cm at a water passing linear velocity of 1 m/h to 40 m/h and a space velocity (SV) of 200 $h^{-1}$ or less.

[10] An apparatus for treating radioactive waste liquid, including an adsorption tower filled with the adsorbent described in any one of [1] to [8] with a layer height of 10 cm to 300 cm.

Effects of the Invention

The present disclosure provides an adsorbent capable of treating iodine compounds such as iodine and iodine oxo acid and/or antimony from cooling water, contaminated water, and the like, which include radioactive iodine generated for a reason such as leakage from a nuclear power plant. The adsorbent of the present disclosure has excellent economic feasibility, and may also adsorb and remove iodine compounds in radioactive waste liquid by means of a facility using less space, which is called as a water passing treatment. Further, the adsorbent of the present disclosure also has excellent adsorption performance of antimony ions, and thus may adsorb and remove not only iodine compounds, but also antimony ions in radioactive waste liquid.

In addition, by using an adsorption tower filled with the adsorbent of the present disclosure, it is possible to adsorb and remove iodine compounds and/or antimony in radioactive waste liquid by a simple water passing treatment in a typical radioactive waste liquid treatment facility. For this reason, a decontamination treatment of radioactive waste liquid can be easily performed without installing a complex or large special facility.

DETAILED DESCRIPTION TO EXECUTE THE INVENTION

Figure 1:
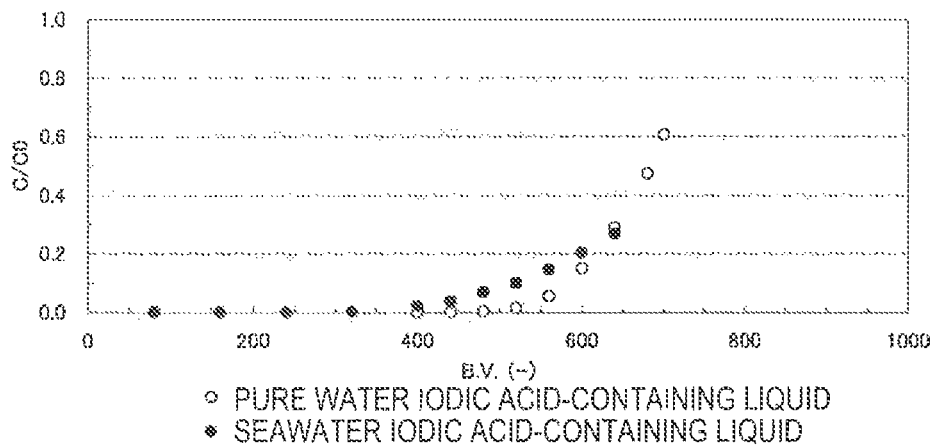
FIG. 1 is a graph illustrating an adsorption behavior of iodate ions by an adsorbent in Example 1.

The present disclosure will be described below in detail.

The adsorbent of the present disclosure is a composition including a polymer resin and 100 parts by weight or more of a hydrous hydroxide of a rare earth element based on 100 parts by weight of the polymer resin, and the hydrous hydroxide of the rare earth element is characterized by having a water content of 1 part by weight to 30 parts by weight based on 100 parts by weight of the dry product in the hydrous hydroxide.

The polymer resin may be an organic polymer resin having a better heat resistance than that of an anion exchange resin or a chelate-based resin and water resistance in which the polymer resin is not eluted in water, or a derivative of the resin. Examples thereof include a fluorine-based resin such as a polyvinylidene fluoride-based resin and a polytetrafluoroethylene-based resin, a polyvinyl-based resin, or a natural polymer such as alginate, and a derivative thereof. Among them, a polyvinylidene fluoride resin and a polyvinylidene fluoride hexafluoropropylene copolymer resin are preferred because the resins are likely to contain a hydrous hydroxide of a rare earth element at high concentration and have excellent water resistance and chemical resistance. Further, the organic polymer resin has a number average molecular weight of preferably 500 or more, and more preferably 2,000 or more. Meanwhile, a water-soluble hydrophilic resin is not preferred because the water-soluble hydrophilic resin is easily eluted in water to be treated, and is more easily eluted due to the high temperature of waste liquid, particularly in the case where the water to be treated is radioactive waste liquid.

As a rare earth element constituting the hydrous hydroxide of the rare earth element, it is possible to preferably use a hydroxide of scandium (Sc), yttrium (Y), lutetium (Lu), lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), or ytterbium (Yb). Among them, an element, which is suitable for the object of the present disclosure and thus preferred, is Ce, a tetravalent Ce is preferred, and a particularly preferable hydrous hydroxide of a rare earth element is $Ce(OH)_4 \cdot nH_2O$. Mixtures of these rare earth element hydroxides are also useful.

The hydrous hydroxide of the rare earth element has a water content of preferably 1 part by weight to 30 parts by weight, and more preferably 5 parts by weight to 15 parts by weight, based on 100 parts by weight of the dry product in the hydrous hydroxide. The reason that the above-mentioned water content is suitable is not clear, but it is assumed that the water content maintains the fluidity of the hydrous hydroxide of the rare earth element at a good level to appropriately mix the hydrous hydroxide of the rare earth element with a polymer resin, an appropriate contact with water to be treated by voids produced among the secondary particles of the hydrous hydroxide of the rare earth element is achieved by maintaining secondarily aggregating hydrous hydroxide particles of the rare earth element to have an appropriate particle diameter, the hydroxide exhibits an adsorption action as a hydroxide by preventing the hydroxide from returning to an oxide, and as a result, the adsorptivity of radioactive iodine and iodine oxo acid is increased.

In addition, the water content rate of a hydrous hydroxide of a rare earth element may be expressed as a value obtained by dividing the weight difference by the weight of the collected hydrous hydroxide of the rare earth element after removing a resin constituting an adsorbent with a resin dissolving agent, collecting the remaining hydrous hydroxide of the rare earth element, and leaving the hydroxide to stand at 800° C. for 1 hour.

The hydrous hydroxide of the rare earth element may be an aggregate having a secondary particle average particle diameter of preferably 0.2 µm to 25 µm, and more preferably 0.5 µm to 10 µm. The primary particles constituting the aggregate may have an average particle diameter of 0.01 µm to 0.1 µm. When the secondary particles have an average particle diameter of less than 0.2 µm, the aggregate is surrounded by a polymer resin, and as a result, the aggregate may be insufficiently brought into contact with water to be treated in some cases, and when the secondary particles have an average particle diameter of more than 25 µm, the aggregate may not be uniformly mixed with the polymer resin in some cases.

The content of the hydrous hydroxide of the rare earth element is 10 parts by weight or more, preferably 400 parts by weight or more, and more preferably 600 parts by weight or more, based on 100 parts by weight of the polymer resin. The upper limit for the content is not basically limited from the viewpoint of adsorptivity. However, the content is preferably 5,000 parts by weight or less, more preferably 1,000 parts by weight or less, and even more preferably 800 parts by weight or less, from the viewpoint of durability of the adsorbent.

Furthermore, the adsorbent of the present disclosure may additionally contain silver zeolite. The content of the silver zeolite is 10 parts by weight or more, and preferably 40 parts by weight or more, based on 100 parts by weight of the polymer resin. The upper limit is not basically limited from the viewpoint of adsorptivity of the adsorbent. However, the content is preferably 400 parts by weight or less, and more preferably 300 parts by weight or less, from the viewpoint of durability of the adsorbent. When an object to be adsorbed is iodine, the content of the silver zeolite is preferably 10 parts by weight or more. When the object to be adsorbed is iodine oxo acid, the adsorbent may not include the silver zeolite.

The silver zeolite is preferably an aggregate having an average particle diameter of 1 µm to 10 µm, which is formed by supporting silver onto a zeolite selected from A-type, X-type, Y-type, β-type, mordenite-type, chabazite-type, or a combination of one or more thereof.

A shape of the adsorbent of the present disclosure may be any shape, but is particularly preferably spherical because it is filled in an adsorption tower, and the adsorbent is preferably a porous molded body which allows water to be treated to pass through the inside of the adsorbent, or a molded body having a mesh structure.

When the adsorbent of the present disclosure is an almost uniform spherical powder, the average particle diameter thereof is preferably 0.2 mm to 5.0 mm, and more preferably 0.5 mm to 2.0 mm. When the average particle diameter is less than 0.2 mm, the filling density becomes so high that the treatment ability of an adsorption tower deteriorates because the water passing resistance of water to be treated becomes high, and conversely, when the average particle diameter is more than 5.0 mm, the treatment ability also deteriorates because the contact area of the adsorbent with water to be treated per unit time is reduced.

Subsequently, a method for preparing the adsorbent of the present disclosure will be described.

First, the moisture content of rare earth element hydroxide particles is adjusted to 1 to 30 parts by weight based on 100 parts by weight of a rare earth element hydroxide (dry product in the hydrous hydroxide). As the rare earth element hydroxide, a commercially available cake-type rare earth element hydroxide may be used. Since the cake-type rare earth element hydroxide includes an excessive amount of water, the moisture amount is adjusted to 1 part by weight to 30 parts by weight based on 100 parts by weight of the dry weight of the rare earth element hydroxide by evaporating moisture at a low temperature of 50° C. to 70° C. using a typical heating device.

The obtained hydrous hydroxide of the rare earth element containing a specific amount of moisture is mixed with a polymer resin. First, a polymer resin solution is prepared by dissolving the polymer resin in an organic solvent. Subsequently, a dispersion is obtained by dispersing 400 parts by weight or more, and preferably 600 parts by weight to 800 parts by weight of hydrous hydroxide particles of the rare earth element based on 100 parts by weight of a polymer resin, and if necessary, 10 parts by weight or more of silver zeolite particles based on 100 parts by weight of the polymer resin. Spherical particles are obtained from the prepared dispersion by using a melt granulation method or a dropping granulation method. Further, when the dispersion is prepared, a polymer resin may be mixed with an organic solvent along with a rare earth element hydroxide and silver zeolite particles, if necessary, without dissolving the polymer resin in the organic solvent in advance. The organic solvent is not particularly limited as long as the organic solvent can dissolve the polymer resin.

Subsequently, an apparatus for treating radioactive waste liquid by using the adsorbent of the present disclosure will be described.

The apparatus for treating radioactive waste liquid of the present disclosure is characterized by including an adsorption tower filled with the adsorbent of the present disclosure with a layer height of 10 cm to 300 cm. When the layer height is less than 10 cm, an adsorbent layer cannot be uniformly filled when an adsorption tower is filled with the adsorbent, and a short pass is caused when water is passed, and as a result, the quality of water to be treated is diminished. A high layer height realizes an appropriate pressure difference while water is passing therethrough, and as a result, the quality of water to be treated is stabilized, and the total amount of water to be treated is also increased, so that the high layer height is preferred, but when the layer height exceeds 300 cm, the pressure difference during water passage becomes so high that the layer height is not practical. The amount of adsorbent filled is determined by complex factors such as the amount of radioactive waste liquid to be treated, treatment speed, and adsorption performance of the adsorbent, and when the same adsorbent is used, the adsorption performance depends on a water passing linear velocity (LV) and a space velocity (SV). The constitution of the adsorption tower and the facility constitution associated with the introduction and release of radioactive waste liquid may be the same as those of a typical apparatus for treating radioactive waste liquid.

Subsequently, a method for treating radioactive waste liquid by using the adsorbent of iodine compounds and/or antimony according to the present disclosure will be described.

The method for treating radioactive waste liquid of the present disclosure is characterized by sufficiently bringing the adsorbent of iodine compounds and/or antimony of the present disclosure into contact with radioactive waste liquid by allowing the radioactive waste liquid to pass through an adsorption tower filled with the adsorbent with a layer height of 10 cm to 300 cm at a water passing linear velocity of 1 m/h to 40 m/h and a space velocity (SV) of 200 $h^{-1}$ or less. The water passage may be any of downflow or upflow. Accordingly, the radioactive iodine and iodine oxo acid remaining in the radioactive waste liquid are adsorbed to the adsorbent of the present disclosure, and thus, may be removed from the waste liquid.

EXAMPLES

Hereinafter, the adsorption treatment ability of the adsorbent of the present disclosure will be described with reference to the Examples.

The adsorption treatment ability of the adsorbent was evaluated as a ratio of concentrations obtained by analyzing the concentration of iodine in the column influent water and the column effluent water by means of inductively coupled plasma-atomic emission spectroscopy (ICP-AES), and analyzing the concentration of iodine 127 by means of an inductively coupled plasma mass spectrometer (ICP-MS) after filling a column having a predetermined volume with the adsorbent, allowing water to be treated, which contains iodine ions and/or iodate ions at predetermined concentrations to pass through the column so as to have a volume by 1 to 10,000 times as compared to the volume of the adsorbent.

Moreover, the amount of water to be treated while passing is indicated by a water passing magnification (B.V.: indicating how many times of volume of water is flowed per the volume of the adsorbent). For example, the water passing magnification 200 B.V. per 1 L of the adsorbent means that 200 L of water to be treated is flowed.

Preparation Example 1

Preparation of Adsorbent Used in Example 1

The moisture content of commercially available cerium hydroxide particles was adjusted to 14 to 16 parts by weight based on 100 parts by weight of a rare earth element hydroxide (dry product). Subsequently, a polymer resin solution was prepared by dissolving a polymer resin in an organic solvent, and a dispersion was obtained by dispersing 600 parts by weight of hydrous hydroxide particles of the rare earth element based on 100 parts by weight of the polymer resin. The obtained dispersion was molded into an aggregate having a secondary particle average particle diameter of 0.2 mm to 5.0 mm by means of a melt granulation method. After the molding, the aggregate was washed sufficiently, and water and the adsorbent were separated by means of a sieve, thereby classifying Adsorbent 1 having a particle diameter of 0.35 to 1.18 mm.

Preparation Example 2

Preparation of Adsorbent Used in Examples 2 and 3

The moisture content of commercially available cerium hydroxide particles was adjusted to 14 to 16 parts by weight based on 100 parts by weight of a rare earth element hydroxide (dry product). Subsequently, a polymer resin solution was prepared by dissolving a polymer resin in an organic solvent, and a dispersion was obtained by dispersing 425 parts by weight of hydrous hydroxide particles of the rare earth element based on 100 parts by weight of the polymer resin and 50 parts by weight of silver zeolite particles based on 100 parts by weight of the polymer resin. The obtained dispersion was molded into an aggregate having a secondary particle average particle diameter of 0.2 mm to 5.0 mm by means of a melt granulation method. After the molding, the aggregate was washed sufficiently, and water and the adsorbent were separated by means of a sieve, thereby classifying Adsorbent 2 having a particle diameter of 0.35 to 1.18 mm.

Preparation Example 3

Preparation of Adsorbent Used in Example 4

The moisture content of commercially available cerium hydroxide particles was adjusted to 14 to 16 parts by weight based on 100 parts by weight of a rare earth element hydroxide (dry product). Subsequently, a polymer resin solution was prepared by dissolving a polymer resin in an organic solvent, and a dispersion was obtained by dispersing 390 parts by weight of hydrous hydroxide particles of the rare earth element based on 100 parts by weight of the polymer resin and 40 parts by weight of silver zeolite particles based on 100 parts by weight of the polymer resin. The obtained dispersion was molded into an aggregate having a secondary particle average particle diameter of 0.2 mm to 5.0 mm by means of a melt granulation method. After the molding, the aggregate was washed sufficiently, and water and the adsorbent were separated by means of a sieve, thereby classifying Adsorbent 3 having a particle diameter of 0.35 to 1.18 mm.

Comparative Preparation Example 1

Spherical particles attempted to be prepared in the same manner as in Preparation Example 1, except that commercially available hydrous hydride particles of cerium were used without adjusting the water content (moisture content of 32 to 36 parts by weight based on 100 parts by weight of the dry product) of the particles, but stable spherical particles could not be obtained.

Example 1

A column test was performed in a system where iodate ions were present by using Adsorbent 1 (particles having a particle diameter of 0.35 to 1.18 mm, containing 600 parts by weight of hydrous hydroxide particles of cerium based on 100 parts by weight of the polymer resin) prepared in Preparation Example 1.

<Raw Water>

(1) It was confirmed that pH=7.0 by dissolving sodium iodate in pure water and adjusting the concentration of iodate ions to be 50 mg/L (hereinafter, referred to as "pure water iodic acid-containing liquid").

(2) It was confirmed that pH=7.0 by dissolving sodium iodate in seawater diluted 10 times and adjusting the concentration of iodate ions to be 50 mg/L (hereinafter, referred to as "seawater iodic acid-containing liquid").

<Water Passing Test>

A layer height of 19 cm was formed by filling a glass column having an internal diameter of 10 mm with 15 ml of Adsorbent 1. A pure water iodic acid-containing liquid as raw water was allowed to pass through the glass column at a flow rate of 2.5 mL/min (water passing linear velocity LV=2 m/h, space velocity SV=10 h$^{-1}$) and the concentration of iodine was measured by means of ICP-AES analysis (Rigaku CIROSccd) by periodically collecting the effluent water. For the seawater iodic acid-containing liquid, a water passing treatment and an iodine concentration analysis were also performed in the same manner as described above.

The results are illustrated in FIG. 1. In FIG. 1, the horizontal axis is B.V., the longitudinal axis is a value (C/C0) obtained by dividing the concentration (C) of iodine at the outlet of the column by the concentration (C0) of iodine at the inlet of the column, and a C/C0 of less than 1.0 indicates that iodate ions are adsorbed. From FIG. 1, it can be seen that by a water passing treatment using the adsorbent of the present disclosure, iodate ions may be removed regardless of a pure water iodic acid-containing liquid and a seawater iodic acid-containing liquid.

Example 2

A column test was performed in a system where iodide ions were present by using Adsorbent 2 (particles having a particle diameter of 0.35 to 1.18 mm, including 425 parts by weight of hydrous hydroxide particles of cerium based on 100 parts by weight of the polymer resin and 50 parts by weight of silver zeolite particles based on 100 parts by weight of the polymer resin) prepared in Preparation Example 2.

<Raw Water> Simulated Water of Contaminated Water of Fukushima First Nuclear Power Plant Simulated seawater was prepared such that the concentration of refined salt became 0.3 wt %. Subsequently, by adding cesium chloride, strontium chloride, calcium chloride, magnesium chloride, and sodium iodide to the simulated seawater, raw water was prepared such that the concentrations of cesium, strontium, calcium, magnesium, and iodide ions became 1 mg/L, 10 mg/L, 400 mg/L, 400 mg/L, and 1 mg/L, respectively.

<Water Passing Test>

A layer height of 10 cm was formed by filling a glass column having an internal diameter of 16 mm with 20 ml of Adsorbent 2. The raw water was allowed to pass through the glass column at a flow rate of 67 mL/min (water passing linear velocity LV=20 m/h, space velocity SV=200 h$^{-1}$), and the concentration of iodine was measured by periodically collecting the effluent water.

For an analysis of the concentration of iodine, a quantitative analysis of iodine 127 was performed by using an ICP-MS analysis (Agilent 7700x).

Figure 2:
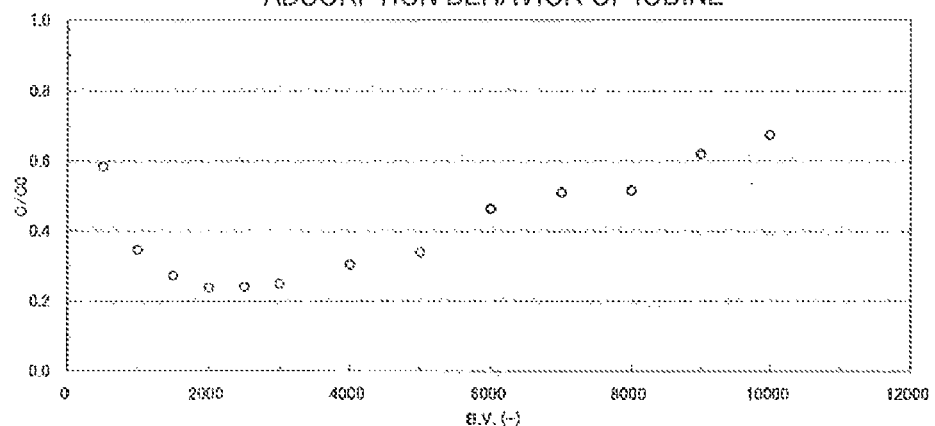
FIG. 2 is a graph illustrating an adsorption behavior of iodide ions by an adsorbent in Example 2.

The results are illustrated in FIG. 2. In FIG. 2, the horizontal axis is B.V., the longitudinal axis is a value (C/C0) obtained by dividing the concentration (C) of iodine 127 at the outlet of the column by the concentration (C0) of iodine 127 at the inlet of the column, and a C/C0 of less than 1.0 indicates that iodide ions are adsorbed. From FIG. 2, it can be seen that by a water passing treatment using the adsorbent of iodine compounds and/or antimony according to the present disclosure, iodide ions may be removed.

Example 3

A column test was performed in a system where iodate ions were present by using Adsorbent 2 (particles having a particle diameter of 0.35 to 1.18 mm, including 425 parts by weight of hydrous cerium oxide particles based on 100 parts by weight of the polymer resin and 50 parts by weight of silver zeolite particles based on 100 parts by weight of the polymer resin) prepared in Preparation Example 2.

<Raw Water> Simulated Water of Contaminated Water of Fukushima First Nuclear Power Plant Simulated seawater was prepared such that the concentration of refined salt became 0.3 wt %. Subsequently, by adding cesium chloride, strontium chloride, calcium chloride, magnesium chloride, and sodium iodate to the simulated seawater, raw water was prepared such that the concentrations of cesium, strontium, calcium, magnesium, and iodate ions became 1 mg/L, 10 mg/L, 400 mg/L, 400 mg/L, and 10 mg/L, respectively.

<Water Passing Test>

A layer height of 10 cm was formed by filling a glass column having an internal diameter of 16 mm with 20 ml of Adsorbent 3. The raw water was allowed to pass through the glass column at a flow rate of 67 mL/min (water passing linear velocity LV=20 m/h, space velocity SV=200 h$^{-1}$), and the concentration of iodine 127 was measured by means of ICP-MS (Agilent 7700x) analysis by periodically collecting the effluent water.

Figure 3:
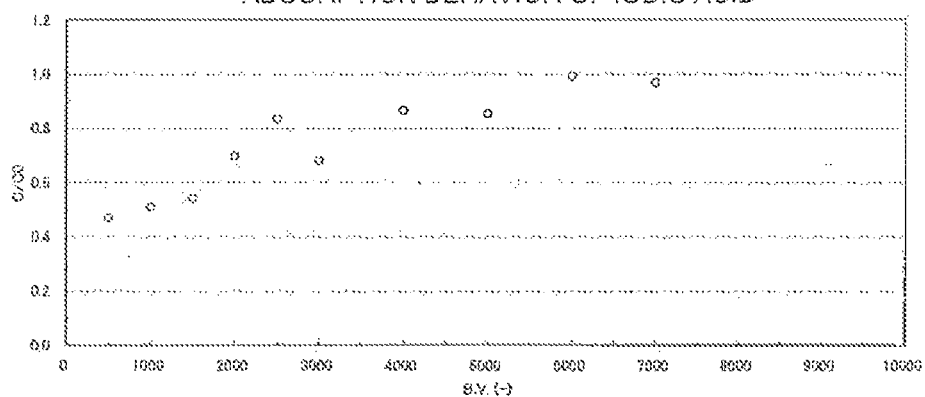
FIG. 3 is a graph illustrating an adsorption behavior of iodate ions by an adsorbent in Example 3.

The results are illustrated in FIG. 3. In FIG. 3, the horizontal axis is B.V., the longitudinal axis is a value (C/C0) obtained by dividing the concentration (C) of iodine 127 at the outlet of the column by the concentration (C0) of iodine 127 at the inlet of the column, and a C/C0 of less than 1.0 indicates that iodate ions are adsorbed. From FIG. 3, it can be seen that iodate ions can be removed by a water passing treatment using the adsorbent of the present disclosure. Accordingly, when combined with Example 2, it can be said that it is possible to adsorb both iodide ions and iodate ions.

Example 4

A column test was performed in a system where iodide ions and iodate ions were intermingled by using Adsorbent 3 (particles having a particle diameter of 0.35 to 1.18 mm, including 390 parts by weight of hydrous hydroxide particles of cerium based on 100 parts by weight of the polymer resin and 40 parts by weight of silver zeolite particles based on 100 parts by weight of the polymer resin) prepared in Preparation Example 3.

<Raw Water> Simulated Water of Contaminated Water of Fukushima First Nuclear Power Plant Simulated seawater was prepared such that the concentration of refined salt became 0.3 wt %. Subsequently, by adding cesium chloride, strontium chloride, calcium chloride, magnesium chloride, sodium iodide, and sodium iodate to the simulated seawater, raw water was prepared such that the concentrations of cesium, strontium, calcium, magnesium, iodide ions, and iodate ions became 1 mg/L, 10 mg/L, 400 mg/L, 400 mg/L, 1 mg/L, and 1 mg/L, respectively.

<Water Passing Test>

A layer height of 100 cm was formed by filling a glass column having an internal diameter of 16 mm with 20 ml of Adsorbent 2. The raw water was allowed to pass through the glass column at a flow rate of 67 mL/min (water passing linear velocity LV=20 m/h, space velocity SV=200 h$^{-1}$), and the concentration of iodine 127 was measured by means of ICP-MS analysis (Agilent 7700x) by periodically collecting the effluent water.

Figure 4:
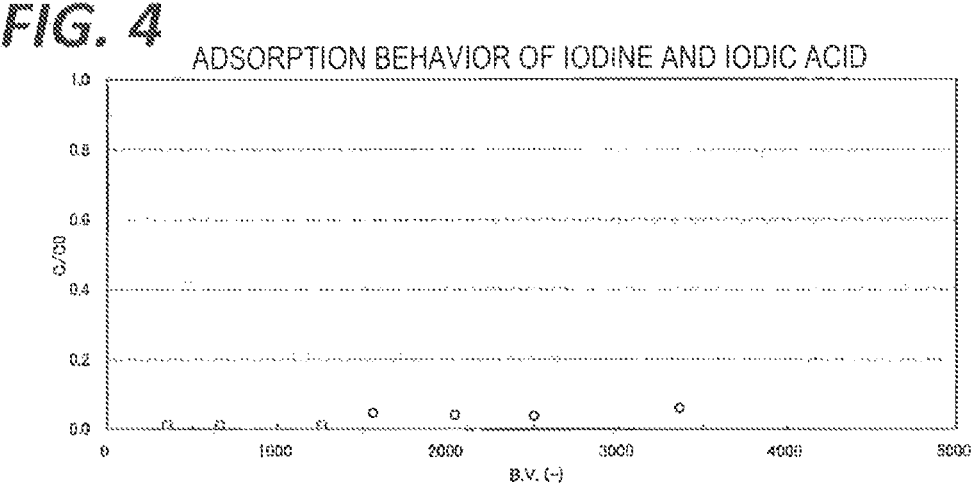
FIG. 4 is a graph illustrating an adsorption behavior of iodate ions and iodide ions by an adsorbent in Example 4.

The results are illustrated in FIG. 4. In FIG. 4, the horizontal axis is B.V., the longitudinal axis is a value (C/C0) obtained by dividing the concentration (C) of iodine 127 at the outlet of the column by the concentration (C0) of iodine 127 at the inlet of the column, and a C/C0 of less than 1.0 indicates that iodide ions and iodate ions are adsorbed. From FIG. 4, it can be seen that iodide ions and iodate ions can be removed by a water passing treatment using the adsorbent of the present disclosure.

Example 5

A batch test was performed in a system where iodate ions were present by using Adsorbents 4-1 to 4-9 (particles having a particle diameters of 0.35 to 1.18 mm, containing 0, 50, 80, 125, 200, 300, 400, 500, or 600 parts by weight of hydrous hydroxide particles of cerium based on 100 parts by weight of the polymer resin) prepared in the same manner as in Preparation Example 1.

<Raw Water>

It was confirmed that pH=7.0 by dissolving sodium iodate in pure water and adjusting the concentration of iodate ions to be 50 mg/L (hereinafter, referred to as "pure water iodic acid-containing liquid").

<Batch Test>

A dedicated container was filled with 1 L of a pure water iodic acid-containing liquid, 2 ml of an adsorbent was added thereto, and the resulting mixture was stirred at 300 rpm by means of a stirrer. The concentration of iodine was measured by means of ICP-AES analysis (Rigaku CIROSccd) by collecting the pure water iodic acid-containing liquid from the dedicated container after 24 hours and after 48 hours.

The results of removing iodic acid are illustrated in Table 1. From Table 1, it can be seen that iodate ions may be removed by a batch treatment using the adsorbent of the present disclosure.

TABLE 1

| Adsorbent | Content of hydrous hydroxide of cerium/ 100 parts by weight (parts by weight) of polymer resin | Removal rate after 24 hours % | Removal rate after 48 hours % |
|---|---|---|---|
| 4-1 | 0 part by weight | 0.0 | 0.0 |
| 4-2 | 50 parts by weight | 25.7 | 25.5 |
| 4-3 | 80 parts by weight | 35.9 | 40.3 |
| 4-4 | 125 parts by weight | 40.2 | 44.4 |
| 4-5 | 200 parts by weight | 53.8 | 55.5 |
| 4-6 | 300 parts by weight | 83.5 | 83.9 |
| 4-7 | 400 parts by weight | 89.6 | 93.0 |
| 4-8 | 500 parts by weight | 91.2 | 93.6 |
| 4-9 | 600 parts by weight | 91.7 | 96.0 |

Example 6

The removal rates of iodate ions after 24 hours were compared by performing a batch test in a system where iodate ions were present by using Adsorbent 4-8 used in Example 5 (particles having a particle diameter of 0.35 to 1.18 mm, containing 500 parts by weight of hydrous cerium oxide particles based on 100 parts by weight of the polymer resin), heterogeneous metal element-containing adsorbents 1 to 4 other than the rare earth element hydroxide illustrated in Table 2, which were prepared in the same manner as that of the adsorbent, and commercially available oxo acid adsorbents 1 to 6, activated carbon 1, and anion adsorbents 1 to 6.

<Raw Water> Simulated Water of Contaminated Water of Fukushima First Nuclear Power Plant Simulated seawater was prepared by using Marine Art SF-1 being a chemical for preparing artificial seawater, manufactured by Osaka Yakken Co., Ltd. Subsequently, sodium iodate was added to an aqueous solution in which the simulated seawater was diluted 10 times, thereby formulating raw water such that the concentration of iodate ions became 10 mg/L.

<Batch Test>

A 200-ml Erlenmeyer flask was filled with 100 ml of the raw water, 1 g of the adsorbent was added thereto, and the resulting mixture was stirred at 300 rpm by means of a stirrer. A quantitative analysis of iodine 127 was performed by means of ICP-MS analysis (Agilent 7700x) by collecting the raw water from the 200-ml Erlenmeyer flask after 24 hours.

The results of removing iodate ions are illustrated in Table 2. From Table 2, it can be seen that the adsorbent of the present disclosure has a significantly high iodate ion removal performance compared to those of the commercially available oxo acid adsorbents, anion adsorbents, and activated carbon.

TABLE 2

| Type of adsorbent | Component/Functional group | Removal rate % after 24 hours |
|---|---|---|
| Adsorbent 4-4 | Cerium hydroxide | 97.1 |
| Heterogeneous metal element-containing adsorbent 1 | Zirconium hydroxide | 32.7 |
| Heterogeneous metal element-containing adsorbent 2 | Siver zeolite | 7.8 |
| Heterogeneous metal element-containing adsorbent 3 | Titanosilicate | 10.2 |
| Heterogeneous metal element-containing adsorbent 4 | Titanium hydroxide | 12.9 |
| Oxo acid adsorbent 1 | Methylglucamine group-type chelate resin | 13.2 |
| Oxo acid adsorbent 2 | Amino phosphoric acid group-type chelate resin | 8.3 |
| Oxo acid adsorbent 3 | Weak basic anion resin | 51.5 |
| Oxo acid adsorbent 4 | Thiourea group-type chelate resin | 24.0 |
| Oxo acid adsorbent 5 | Strong basic anion resin | 11.9 |
| Oxo acid adsorbent 6 | Methylglucamine group-type chelate resin | 5.7 |
| Anion adsorbent 1 | Polyamine group-type chelate resin | 7.4 |
| Anion adsorbent 2 | Amino carboxylic acid group-type chelate resin | 28.9 |
| Anion adsorbent 3 | Strong basic anion resin | 13.4 |
| Anion adsorbent 4 | Amino phosphoric acid group-type chelate resin | 0.0 |
| Anion adsorbent 5 | Polyamine group-type chelate resin | 0.0 |
| Anion adsorbent 6 | Iminodiacetic acid group-type chelate resin | 9.2 |
| Activated carbon 1 | Liquid-phase palm shell granular activated carbon | 5.4 |

Example 7

A column test was performed in a system where antimony ions were present by using Adsorbent 1 (particles having a particle diameter of 0.35 to 1.18 mm, containing 600 parts by weight of hydrous hydroxide particles of cerium based on 100 parts by weight of the polymer resin) prepared in Preparation Example 1.

<Raw Water>

(1) It was confirmed that pH=7.0 by dissolving antimony chloride in pure water and adjusting the concentration of antimony tons to be 10 mg/L (hereinafter, referred to as "pure water antimony-containing liquid").

(2) It was confirmed that pH=7.2 by dissolving antimony chloride in seawater diluted 10 times and adjusting the concentration of antimony ions to be 2 mg/L (hereinafter, referred to as "seawater antimony-containing liquid").

<Water Passing Test>

A layer height of 19 cm was formed by filling a glass column having an internal diameter of 10 mm with 15 ml of Adsorbent 1. A pure water antimony-containing liquid as raw water was allowed to pass through the glass column at a flow rate of 2.5 mL/min (water passing linear velocity LV=2 m/h, space velocity SV=10 h$^{-1}$), and the concentration of antimony was measured by means of ICP-AES analysis (Rigaku CIROSccd) by periodically collecting the effluent water. For the seawater antimony-containing liquid, a water passing treatment and a concentration analysis were also performed in the same manner as described above.

Figure 5:
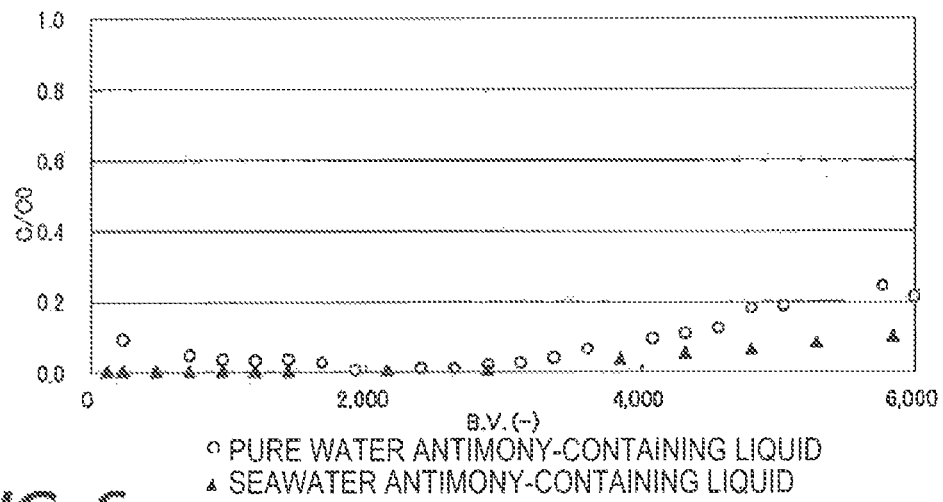
FIG. 5 is a graph illustrating an adsorption behavior of antimony ions by an adsorbent in Example 7.

The results are illustrated in FIG. 5. In FIG. 5, the horizontal axis is B.V., the longitudinal axis is a value (C/C0) obtained by dividing the concentration (C) of iodine at the outlet of the column by the concentration (C0) of antimony at the inlet of the column, and a C/C0 of less than 1.0 indicates that antimony ions are adsorbed. From FIG. 5, it can be seen that by a water passing treatment using the adsorbent of the present disclosure, antimony ions can be removed regardless of a pure water antimony-containing liquid and a seawater antimony-containing liquid.

Example 8

A column test was performed in a system where antimony ions were present by using Adsorbent 1 (particles having a particle diameter of 0.35 to 1.18 mm, containing 600 parts by weight of hydrous hydroxide particles of cerium based on 100 parts by weight of the polymer resin) prepared in Preparation Example 1.

<Raw Water> Simulated Water of Contaminated Water of Fukushima First Nuclear Power Plant Simulated seawater was prepared such that the concentration of refined salt became 0.3 wt %. Subsequently, by adding cesium chloride, strontium chloride, calcium chloride, magnesium chloride, sodium iodate, and antimonyl potassium tartrate to the simulated seawater, raw water was prepared such that the concentration of cesium, strontium, calcium, magnesium, iodate ions, and antimony ions became 1 mg/L, 10 mg/L, 400 mg/L, 400 mg/L, 10 mg/L, and 10 mg/L, respectively.

<Water Passing Test>

A layer height of 10 cm was formed by filling a glass column having an internal diameter of 16 mm with 20 ml of Adsorbent 1. The raw water was allowed to pass through the glass column at a flow rate of 67 mL/min (water passing linear velocity LV =20 m/h, space velocity SV=200 h$^{-1}$), and the concentrations of iodine 127 and antimony 122 were measured by means of ICP-MS (Agilent 7700x) analysis by periodically collecting the effluent water.

Figure 6:
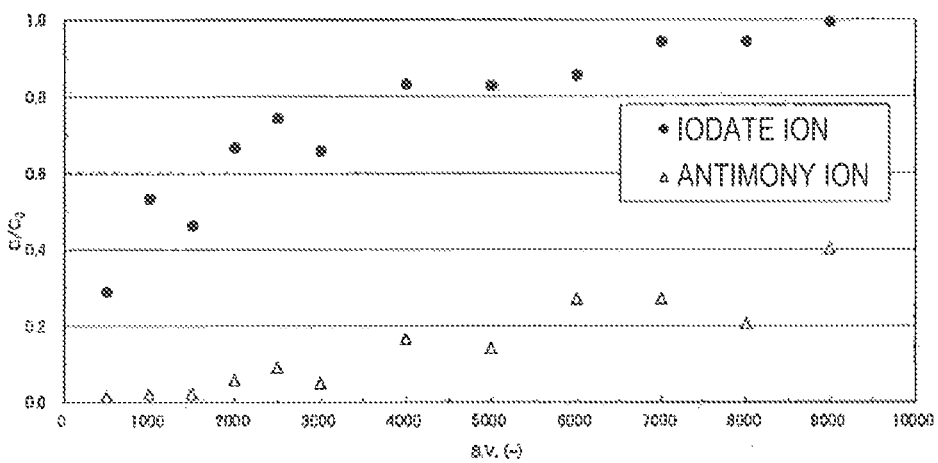
FIG. 6 is a graph illustrating tan adsorption behavior of antimony ions and iodate ions by an adsorbent in Example 8.

The results are illustrated in FIG. 6. In FIG. 6, the horizontal axis is B.V., the longitudinal axis is a value (C/C0) obtained by dividing the concentration (C) of iodine 127 or antimony 122 at the outlet of the column by the concentration (C0) of iodine 127 or antimony 122 at the inlet of the column, and a C/C0 of less than 1.0 indicates that iodate ions or antimony ions are adsorbed. From FIG. 6, it can be seen that both iodate ions and antimony ions can be removed by a water passing treatment using the adsorbent of the present disclosure.

Example 9

The removal rates of antimony ions after 24 hours were compared by performing a batch test in a system where antimony ions were present by using Adsorbent 4-8 used in Example 5 (particles having a particle diameter of 0.35 to 1.18 mm, containing 500 parts by weight of hydrous cerium oxide particles based on 100 parts by weight of the polymer resin), heterogeneous metal element-containing adsorbent 1 other than the rare earth element hydroxide illustrated in Table 3, which was prepared in the same procedure as that of the adsorbent, and commercially available oxo acid adsorbents 2 and 3, activated carbon 1, and anion adsorbents 4 to 6.

<Raw Water> Simulated Water of Contaminated Water of Fukushima First Nuclear Power Plant Simulated seawater was prepared by using Marine Art SF-1 being a chemical for preparing artificial seawater, manufactured by Osaka Yakken Co., Ltd. Subsequently, antimony chloride was added to an aqueous solution in which the simulated seawater was diluted 10 times, thereby formulating raw water such that the concentration of antimony ions became 4 mg/L.

<Batch Test>

A 200-ml Erlenmeyer flask was filled with 50 ml of the raw water, 0.5 g of the adsorbent was added thereto, and the resulting mixture was left to stand. A quantitative analysis of antimony 122 was performed by means of ICP-MS analysis (Agilent 7700x) by collecting the raw water from the 200-ml Erlenmeyer flask after 24 hours.

The results of removing antimony ions are illustrated in Table 3. From Table 3, it can be seen that the adsorbent of the present disclosure has a significantly high antimony ion removal performance compared to those of the commercially available oxo acid adsorbents, anion adsorbents, and activated carbon. Further, considering the results illustrated in Table 2, it can be seen that the adsorbent of the present disclosure has a significantly high removal performance of both iodic acid and antimony ions compared to those of the commercially available oxo acid adsorbents, anion adsorbents, and activated carbon. Accordingly, the adsorbent of the present disclosure can decontaminate not only iodine compounds, but also antimony in radioactive waste liquid.

TABLE 3

| Type of adsorbent | Component/Functional group | Removal rate % after 24 hours |
|---|---|---|
| Adsorbent 4-8 | Cerium hydroxide | 99.5 |
| Heterogeneous metal element-containing adsorbent 1 | Zirconium hydroxide | 97.6 |
| Oxo acid adsorbent 2 | Amino phosphoric acid group-type chelate resin | 95.1 |
| Oxo acid adsorbent 3 | Weak basic anion resin | 87.8 |
| Anion adsorbent 4 | Amino phosphoric acid group-type chelate resin | 0.0 |
| Anion adsorbent 5 | Polyamine group-type chelate resin | 0.0 |
| Anion adsorbent 6 | Iminodiacetic acid group-type chelate resin | 0.0 |
| Activated carbon 1 | Liquid-phase palm shell granular activated carbon | 0.0 |

What is claimed is:

1. An adsorbent comprising:
   a polymer resin; and
   10 parts by weight or more of a hydrous hydroxide of a rare earth element based on 100 parts by weight of the polymer resin,
   wherein the hydrous hydroxide of the rare earth element has a water content of 1 part by weight to 30 parts by weight based on 100 parts by weight of a dry product thereof, and adsorbs iodine compounds and/or antimony.

2. The adsorbent of claim 1, wherein the adsorbent has an average particle diameter of 0.2 mm to 5.0 mm.

3. The adsorbent of wherein the hydrous hydroxide of the rare earth element is an aggregate whose secondary particles have an average particle diameter of 0.2 µm to 25 µm.

4. The adsorbent of claim 1, wherein the polymer resin is a fluorine-based resin or a polyvinyl-based resin, and
   the rare earth element constituting the hydrous hydroxide of the rare earth element is selected from scandium (Sc), yttrium (Y), a lanthanoid element, lanthanum (La), cerium (Ce), praseodymium (Pr), neodymium (Nd), promethium (Pm), samarium (Sm), europium (Eu), gadolinium (Gd), terbium (Tb), dysprosium (Dy), holmium (Ho), erbium (Er), thulium (Tm), ytterbium (Yb), lutetium (Lu), and a combination thereof.

5. The adsorbent of claim 4, wherein the hydrous hydroxide of the rare earth element is cerium hydroxide (IV).n-hydrate ($Ce(OH)_4 \cdot nH_2O$).

6. The adsorbent of claim 1, wherein a content of the hydrous hydroxide of the rare earth element is 400 parts by weight or more based on 100 parts by weight of the polymer resin.

7. The adsorbent of claim 1, further comprising 10 parts by weight or more of silver zeolite based on 100 parts by weight of the polymer resin.

8. The adsorbent of claim 7, wherein the silver zeolite is an aggregate having an average particle diameter of 1 µm to 10 µm, which is formed by supporting silver onto a zeolite selected from A-type, X-type, Y-type, β-type, mordenite-type, chabazite-type, or a combination of one or more thereof.

9. A method for treating radioactive waste liquid, comprising adsorbing and removing iodine compounds and/or antimony by allowing the radioactive waste liquid to pass through an adsorption tower filled with the adsorbent of claim 1 with a layer height of 10 cm to 300 cm at a water passing linear velocity (LV) of 1 m/h to 40 m/h and a space velocity (SV) of 200 h-1 or less.

10. An apparatus for treating radioactive waste liquid, comprising an adsorption tower filled with the adsorbent of claim 1 with a layer height of 10 cm to 300 cm.

* * * * *